United States Patent [19]

Hoben et al.

[11] Patent Number: 5,214,875
[45] Date of Patent: Jun. 1, 1993

[54] MULTIPLE BARB FISH HOOK

[75] Inventors: Donald M. Hoben, Westminster; Joseph E. Bartell, Littleton, both of Colo.

[73] Assignee: Wright & McGill Co., Denver, Colo.

[21] Appl. No.: 859,832

[22] Filed: Mar. 30, 1992

[51] Int. Cl.⁵ ............................................. A01K 83/00
[52] U.S. Cl. ................................................. 43/43.16
[58] Field of Search .............. 43/43.16, 44.8, 44.82, 43/44.2, 44.4, 44.6

[56] References Cited

U.S. PATENT DOCUMENTS

| | | | |
|---|---|---|---|
| 523,988 | 8/1894 | Martin | 43/43.16 |
| 620,896 | 3/1899 | Edgar | 43/43.16 |
| 842,594 | 1/1907 | Van Vleck | 43/43.16 |
| 4,214,398 | 7/1980 | Campbell et al. | 43/43.16 |
| 4,294,031 | 10/1981 | Manno | 43/43.16 |
| 5,024,020 | 6/1991 | Sitton | 43/44.8 |

FOREIGN PATENT DOCUMENTS 2137861A 10/1984 United Kingdom ............... 43/43.16

Primary Examiner—Richard K. Seidel
Assistant Examiner—Chuck Y. Mah
Attorney, Agent, or Firm—Sheridan, Ross & McIntosh

[57] ABSTRACT

A fish hook is provided having at least two barbs located adjacent to the penetrating point found at the end of the hook. Critical to proper functioning of the double barb configuration is the predetermined distance between the two barbs. The predetermined distance is a function of the wire diameter from which the fish hook is made and the heights of the first and second barbs. Preferably, these two heights are the same. The critical ranges for the heights of the barbs and the spacing therebetween are: barb height range is 0.2–0.8 of the wire diameter and the predetermined distance range is 2.0–4.0 of the barb height.

5 Claims, 2 Drawing Sheets

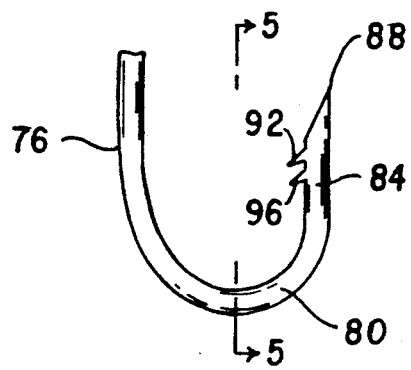 
FIG. 4  FIG. 5
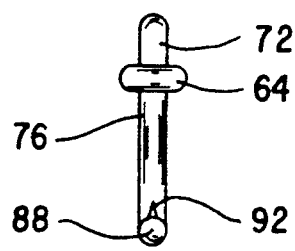 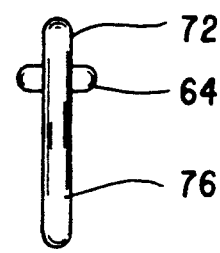
FIG. 6  FIG. 7
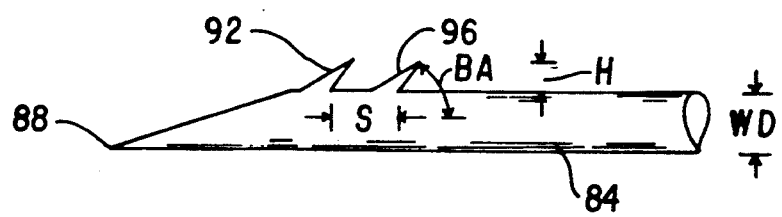
FIG. 8

MULTIPLE BARB FISH HOOK

FIELD OF THE INVENTION

The present invention relates to a fish hook and, in particular, to a fish hook having more than one barb for engaging the tissue of a fish.

BACKGROUND OF THE INVENTION

A great variety of sizes and types of fish hooks have been proposed or devised. Generally speaking, such differently configured fish hooks are intended to better catch and hold the different types and sizes of fish. In connection with preventing escape of the fish after it has struck the fish hook, it is commonplace to use a barb that is located near the tip or penetrating point of the fish hook. It is well known to use a single barb that enters the flesh of the fish when it strikes the hook, with the location and shape of the barb acting to hold the fish to the hook.

Although single barb hooks are commonly available, some hooks have been devised that include one or more piercing projections, in addition to the commonly provided single barb. In U.S. Pat. No. 523,988 to Martin, issued Aug. 7, 1894 and entitled "Fish Hook," a combination of a single barb with one or more smaller beards is disclosed. The smaller beard(s) are located forward of the single barb and relatively more adjacent to the penetrating point or tip of the fish hook. U.S. Pat. No. 2,962,833 to Stinson, issued Dec. 6, 1960 and entitled "Attachment for Fish Hooks" describes a number of burrs bent at different angles for use in holding bait. U.S. Pat. No. 620,896 to Edgar, issued Mar. 14, 1899 and entitled "Fish Hook" and U.S. Pat. No. 2,233,863 to Driscoll Mar. 4, 1941 and entitled "Fishhook" disclose a number of unaligned barbs that are located along opposite or different parts of the fish hook but are adjacent to the penetrating point of the hook. In U.S. Pat. No. 2,906,054 to Morehead, issued Sep. 29, 1959 and entitled "Fish Hook," a large number of splines are disposed surrounding the tip of the fish hook and adjacent to portions thereof. The splines are formed at different angles along the length of the tip. U.S. Pat. No. 2,266,725 to Andrews, issued Dec. 23, 1941 and entitled "Fishhook" relates to a double barb fish hook in which a second barb is located a significant distance from the tip of the fish hook and along the shank thereof. U.S. Pat. No. 1,717,190 to Coleman, issued Jun. 11, 1929 and entitled "Fishhook" and U.S. Pat. No. 666,309 to Fiege, issued Jan. 22, 1901 and entitled "Fish Hook," show multiple barbs connected to separate sections of the fish hook, which sections are joined to a common portion of the fish hook.

Despite the disclosures in the prior art of fish hooks having multiple barbs, it would be advantageous to provide a fish hook that has more than one barb for better securing the fish to the fish hook, while keeping the fish hook design relatively simple in comparison with single barbed fish hooks and inexpensively manufacturable for a variety of different sizes and/or types of fish hooks.

SUMMARY OF THE INVENTION

In accordance with the present invention, a fish hook is provided having multiple, preferably two, barbs that are disposed relatively near the penetrating point of the fish hook. The multiple barb configuration of the present invention accomplishes two major functions. First, the additional force required for insertion of a second barb during the hook setting is not great so that the total force required approaches, or is not much different from, the force required for insertion of a single or first barb when the second barb is located directly behind the first barb. Secondly, the extraction force for removal of the preferably double barb will be much larger, approaching two times that required for a single barb. Generally speaking, in achieving these functions, the second barb of a double barb fish hook is the same size and configuration as the standard single barb whereby significantly greater holding power is provided, together with essentially the same penetration force as that found in the single barb hook. In another conceptual version, smaller barbs are utilized to produce virtually the same holding power as the standard single size barb but at a significantly reduced insertion force. A great number of double barb configurations can be provided between these two conceptual versions of the double barb fish hook of the present invention.

More particularly, in a preferred embodiment, the multiple barb fish hook is a double barb fish hook in which a second barb has the same size and configuration of the first barb. The first barb is located adjacent to the penetrating point of the fish hook and the second barb is located directly behind the first barb. The angle of the two barbs is the same. The spacing between the two barbs is a function of the wire diameter of the fish hook, which corresponds to the diameter of the shank portion of the fish hook, and the heights of the barbs, with the heights thereof being substantially the same for both of the barbs in the double barb fish hook configuration. To achieve the major functions, the distance or spacing between the first and second barbs is critical and predetermined. That is, the distance separating the first and second barbs must be between a predetermined range based on the fish hook shank or wire diameter and the heights of the barbs.

Based on the foregoing summary, the salient features of the present invention are readily discerned. A fish hook is provided for better catching and holding the fish. In the double barb configuration, essentially the same barb insertion force is achieved while approximately doubling the force that must be overcome by the fish in order to extract or release the barbs and escape from the fish hook. In accomplishing these main objectives, a predetermined and critical range of barb spacing must be maintained. This is accomplished by a relatively simple design for ease of manufacture.

Additional advantages of the present invention will become readily apparent from the following discussion, particularly when taken in conjunction with the accompanying drawings.

BRIEF DESCRIPTION OF THE DRAWINGS

FIG. 4 is a greatly enlarged, fragmentary side elevational view of the two barbs;

FIG. 5 is a greatly enlarged, fragmentary view, taken along lines 5—5 of FIG. 4, illustrating the two barbs;

FIG. 6 is a greatly enlarged top view of the double barb hook with the second barb hidden from view by the first barb;

FIG. 7 is a greatly enlarged bottom view of the double barb hook with the barbs hidden from view; and FIG. 8 is a greatly enlarged, fragmentary section of the fish hook illustrating the two barbs with dimensional parameters being identified thereon.

DETAILED DESCRIPTION OF THE INVENTION

Figure 1:
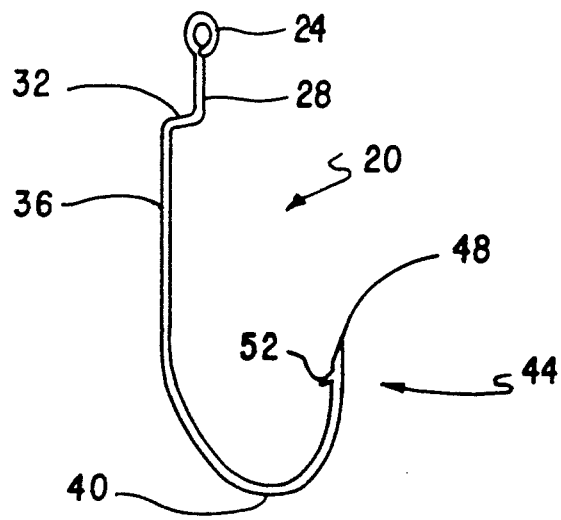
FIG. 1 is a perspective view of a prior art single barb fish hook illustrating an enlarged single barb adjacent to the penetrating point of the fish hook.

With reference to FIG. 1, a single barb hook of the prior art is illustrated for comparison purposes. The prior art fish hook 20 is typically made from a single piece of wire and is formed to include common portions of the typical prior art fish hook. That is, the fish hook 20 is an integral one piece device that includes an eyelet 24 located at one end of the fish hook 20. The eyelet defines an opening for receiving fishing line or the like to connect the fish hook 20 to other fishing tackle, such as a rod and reel. A shaft 28 extends substantially vertically from the bottom of the eyelet 24 and terminates at an offset section 32. The offset section 32 is used in providing a desired movement or action when the fish strikes the fish hook 20. It should be appreciated, however, that a great number of prior art fish hooks do not include such an offset section. Integrally joined to the offset section 32 is a shank 36 that also extends substantially vertically and substantially parallel to the shaft 28 for most of its length. The opposite end of the shank 36 curves or bends into what is defined as a bent section 40 that has portions that curve upwardly in forming the hook section 44. The hook section 44 includes a sharp penetrating point or tip 48 and a single barb 52, both of which are to be used in penetrating the tissue of the fish when its mouth strikes or engages the hook section 44. The single barb 52 is located at a desired distance below the penetrating point 48 and is at a desired angle for penetrating the flesh of the fish for the primary purpose of keeping the fish on the fish hook 20 after penetration.

Figure 2:
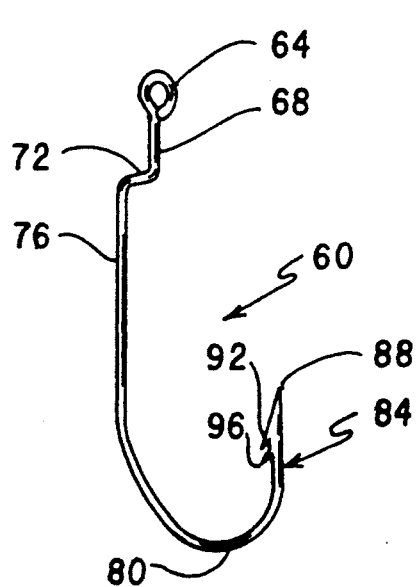
FIG. 2 is a side elevational view of the present invention illustrating the double barbs.

With reference now to FIG. 2, the present invention is directed to enhancing the objective of maintaining a fish on a fish hook after being caught, while substantially avoiding any increase in the force required associated with barb penetration. Like the prior art fish hook 20, the fish hook 60 of the present invention includes an eyelet 64 for receiving the fishing line. The eyelet 64 terminates in a shaft 68 that extends for a short distance before there is a substantially 90° bend to form an offset section 72. A major part of the fish hook 60 is a shank 76 that extends vertically from the offset section 72 and curves to integrally join a bent section 80. A hook section 84 extends from the bent section 80 and terminates at a free end opposite that of the eyelet 64. The hook section 84, like the prior art hook section 44, includes a sharp penetrating point or tip 88. However, unlike the prior art fish hook 20, the hook section 84 includes multiple barbs, preferably two barbs 92, 96. The two barbs 92, 96 are configured to provide increased resistance or holding power to keep the fish on the fish hook 60 when it is caught, in comparison with the single barb fish hook 20, while substantially avoiding the requirement for increased force to cause the penetration of the two barbs 92, 96 into the flesh of the fish, in comparison with the penetration force required for the single barb 52 of the prior art fish hook 20.

Figure 3:
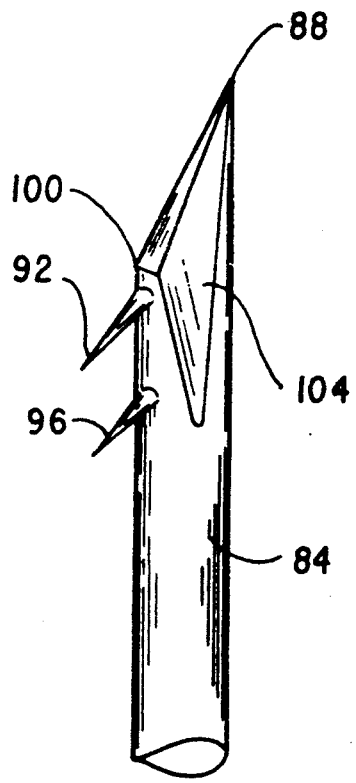
FIG. 3 is a greatly enlarged, fragmentary perspective view of the two barbs and the penetrating point of the fish hook.

With reference to FIGS. 3-7, further and more detailed views of the arrangement of the barbs 92, 96 are illustrated for accomplishing and balancing these two offsetting factors or objectives. As seen in FIG. 3, the barbs 92, 96 are at a relatively close distance to each other. The first barb 92 is located substantially at or near the apex 100 of the triangular-shaped member 104 that is formed by removal of wire material from that portion of the hook section 84. Each of the barbs 92, 96 has a pointed tip and a surface area including a height. These parameters affect the penetration force and extraction force associated with each barb. The penetration force corresponds to the force required to cause penetration of the barb into the tissue of the fish. The extraction force corresponds to the force required to cause removal of the barb from the fish's tissue. As seen in FIG. 4, the second barb 96 has substantially the same size and forms substantially the same angle as the first barb 92, relative to a straight line through the vertical extending portion of the hook section 84. As illustrated in FIGS. 5 and 6, the first and second barbs 92, 96 are in alignment along the vertical extending portion of the hook section 84, with the view from the penetrating point 88 (FIG. 6) showing the first barb 92 blocking the view of the second barb 96. With respect to the width or cross-section of the barbs 92, 96, as seen in FIG. 7, each is smaller than the wire diameter found in the hook section 84 since the barbs 92, 96 are hidden from view.

Critical to achieving the desired functions of ease of barb penetration while maintaining the fish on the fish hook 60 when it is caught, are the dimensional parameters associated with the hook section 84, particularly the spacing or predetermined distance between the first and second barbs 92, 96. With reference to FIG. 8, a number of parameters are noted. The wire diameter (WD) is the diameter or size of the wire that is used in making the fish hook. The wire diameter, for example, corresponds to the diameter of the shank 76. The wire diameter can vary in fractions of an inch, typically depending upon the type or species of fish that is intended to be caught with the particular fish hook. By way of example, the wire diameter for the fish hook illustrated in FIG. 2 can vary from about 0.030 inch 0.090 inch. The barb angle (BA) is also illustrated. The barb angle is defined as the angle formed by the barb using its distal side, relative to the point 88, and a straight line through the hook section 84. To achieve the desired balancing between ease of penetration of the barbs 92, 96 and enhanced holding power, the barb angle BA should be in the range of 30°-50°. As previously noted, the barb angle for the first barb 92 should preferably be the same as the barb angle for the second barb 96. With continued reference to FIG. 8, a dimensional parameter H is defined. The parameter H corresponds to the height of the barbs 92, 96, as measured from the bottom of each barb at the outer periphery or circumference of the hook section 84 to the tip of each barb. In the preferred embodiment, the height H of the first barb 92 is the same as the height H of the second barb 96. The critical parameter illustrated in FIG. 8 is the predetermined distance or spacing S between first barb 92 and the second barb 96. As seen in FIG. 8, the spacing S is measured from the distal or back side from the first barb 92 to the distal or back side of the second barb 96, along the extent or portion of the hook section 84 between the two barbs 92, 96. The spacing (S) is a function of the wire diameter (WD) and the height (H) of the barbs 92, 96. Generally, the smaller the value of H, the smaller is the value of S.

With regard to at least the preferred embodiment of two barbs of the multiple barb invention, there is a standard or normal barb height (H) and a standard or normal predetermined distance or spacing (S). These are defined by the following relationships:

$$Standard\ H = 0.5\ WD \qquad (1)$$

$$Standard\ S = 3.0\ H \qquad (2)$$

As can be appreciated, if WD = 1 unit, then the spacing S = 3.0 × 0.5 = 1.5 units.

However, it is not necessary that the barb height and the spacing be the standard or normal value. It is critical that the barb height and the spacing be within certain ranges. If they are outside the ranges, the primary functions associated with the two barbs 92, 96 are not achieved. These ranges are defined as follows:

$$Barb\ H\ (range) = 0.2\ WD-0.8\ WD \qquad (3)$$

$$S\ (range) = 2.0\ H-4.0\ H \qquad (4)$$

From the foregoing relationships (1)-(4), the height (H) of the barbs 92, 96 plus the wire diameter (WD) will normally be about 150% of the wire diameter, but H + WD could range from 120%-180%. With respect to the spacing between the first barb 92 and the second barb 96, such will normally be about 150% of the wire diameter but must be between 100%-200% thereof. For example, where WD = 1 unit, H is in the range of: 0.2-0.8 unit, while S is in the range of 1.0-2.0 units. Generally, in the same example, where H is 0.2 unit, S is about 1.0 unit and where H = 0.8, S = about 2.0 units. As can be appreciated, however, for a particular H within the designated range, the spacing (S) between the barbs 92, 96 could be different, so long as the value is within the range defined in relationship (4).

It should be understood from the foregoing that the heights of the multiple barbs may be different, although it is preferred that they be substantially the same height. In any case, the height of the second barb should not be greater than the height of the first barb. It should also be appreciated that the foregoing is applicable to fish hooks having more than two barbs.

Based on the foregoing description, a number of salient features of the present invention should be immediately recognized. A multiple barb fish hook is provided for enhancing the holding power of the hook in the tissue of the fish while maintaining essentially the same force of penetration as found in a single barb fish hook. This is accomplished by the unique arrangement of the barbs, particularly the predetermined distance or spacing between the double barbs. The double barb is a relatively simple configuration that utilizes features associated with the single barb fish hook. Relatedly, manufacture of the double barb fish hook does not involve considerably more effort than that required for the single barb fish hook.

The foregoing description of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiment described hereinabove is further intended to explain the best mode known of practicing the invention and to enable others skilled in the art to utilize the invention in such, or other, embodiments and with the various modifications required by their particular applications or uses of the invention. It is intended that the appended claims be construed to include alternative embodiments to the extent permitted by the prior art.

What is claimed is:

1. A fish hook having multiple barbs, comprising:
   means for receiving fishing line;
   shank means extending from said means for receiving;
   a bent section integrally formed with said shank means;
   a penetrating point located on the end of the fish hook opposite that of said means for receiving;
   a first barb located between said point and said bent section, said first barb having a tip and a surface area
   a second barb spaced a predetermined distance from said first barb, said second barb located between said first barb and said bent section, said second barb having a tip and a surface area, said first barb having a first height and said second barb having a second height and said shank means having a wire diameter and wherein said predetermined distance that said second barb is spaced from said first barb depends upon the magnitudes of said first and second heights and said wire diameter and in which said first barb height and said second barb height are in the range of 0.2-0.8 of said wire diameter and said predetermined distance is in the range of 2.0-4.0 of at least said height of said first barb, said penetrating point and said first and second barbs being part of a hook section.

2. An apparatus, as claimed in claim 1, wherein:
   said first height is substantially the same as said second height.

3. A fish hook, as claimed in claim 1, wherein:
   said first barb height and said second barb height are substantially about 0.5 of said wire diameter and said predetermined spacing is substantially about three times said height of at least one of said first barb height and said second barb height.

4. A fish hook, as claimed in claim 1, wherein:
   each of said first barb and said second barb forms an angle relative to a longitudinal axis passing through a straight portion of said hook section and each of said angles is in the range of 30°-50°.

5. A method for catching a fish using a fish hook having multiple barbs, comprising:
   providing a fish hook including first and second barbs, each of said first and second barbs having a height and with said second barb being located a predetermined distance from said first barb and adjacent to a penetrating point of said fish hook, said predetermined distance being a function of a wire diameter associated with said fish hook and said height of at least one said first and second barbs, wherein said barb heights of each of said first and second barbs, wherein said barb heights of each of said wire diameter and said predetermined distance being in the range of 2.0-4.0 of at least one of said first and second barb heights;
   having a fish strike said fish hook;
   penetrating tissue of the fish with said first barb and said second barb;
   using substantially the same force in penetrating the tissue of the fish with said first and second barbs as the force required in penetrating using only said first barb;
   releasing the fish from said first and second barbs; and
   using substantially twice the force in releasing the fish from said first and second barbs as required in releasing the fish only from said first barb.

* * * * *

UNITED STATES PATENT AND TRADEMARK OFFICE
CERTIFICATE OF CORRECTION

PATENT NO. : 5,214,875
DATED : June 1, 1993
INVENTOR(S) : Donald M. Hoben; Joseph E. Bartell It is certified that error appears in the above-identified patent and that said Letters Patent is hereby corrected as shown below:

Column 6,
Lines 53 and 54 of Claim 5, ", wherein said barb heights of each" should be deleted and -- being in the range of .2-.8 -- should be added.

Signed and Sealed this

Twenty-third Day of October, 2001

Attest:

NICHOLAS P. GODICI
Attesting Officer      Acting Director of the United States Patent and Trademark Office